United States Patent [19]

Szabo

[11] 4,005,974
[45] Feb. 1, 1977

[54] MOLD-CLOSING UNIT, PARTICULARLY FOR INJECTION-MOLDING MACHINES

[75] Inventor: Tibor Szabo, Ludenscheid, Germany

[73] Assignee: Tibor Szabo, Ludenscheid, Germany

[22] Filed: Jan. 24, 1975

[21] Appl. No.: 543,919

[30] Foreign Application Priority Data

Jan. 29, 1974 Germany ............................ 2404105

[52] U.S. Cl. .................. 425/450.1; 91/411 B; 91/416; 100/269 R; 425/DIG. 223
[51] Int. Cl.² ....................... B29F 1/00; F15B 11/00
[58] Field of Search ............ 425/450.1, 244, 451.2, 425/451.9, 451, 242, DIG. 223; 100/269 R; 91/411 B, 416, 405, 394, 422; 92/60, 146, 151; 264/328, 329

[56] References Cited
UNITED STATES PATENTS

| 2,232,449 | 2/1941 | Habenicht | 92/146 X |
| 2,300,162 | 10/1942 | Maude | 100/269 R X |
| 3,199,410 | 8/1965 | Hereth | 91/416 X |
| 3,336,788 | 8/1967 | Ottestad | 100/269 R |
| 3,557,663 | 1/1971 | Florjancic | 425/242 X |
| 3,669,593 | 6/1972 | Cyriax | 425/242 X |
| 3,856,454 | 12/1974 | Aoki | 425/DIG. 223 X |

Primary Examiner—Francis S. Husar
Assistant Examiner—John S. Brown
Attorney, Agent, or Firm—Meyer, Tilberry & Body

[57] ABSTRACT

A mold closing unit for an injection molding machine having a double acting mold closing piston, a closable valve interconnecting both sides of the piston, an auxiliary piston, and a piston rod for each piston, each connecting one side of the pistons to the movable mold part wherein the cylinder spaces on mold closing side of the two pistons are permanently communicated whereby the change in volume of the combined working space is proportional to the areas of the piston rods. The cylinder for the auxiliary piston is placed laterally of the main cylinder so that the overall length of the machine is held to a minimum. An additional return piston is also provided.

11 Claims, 1 Drawing Figure

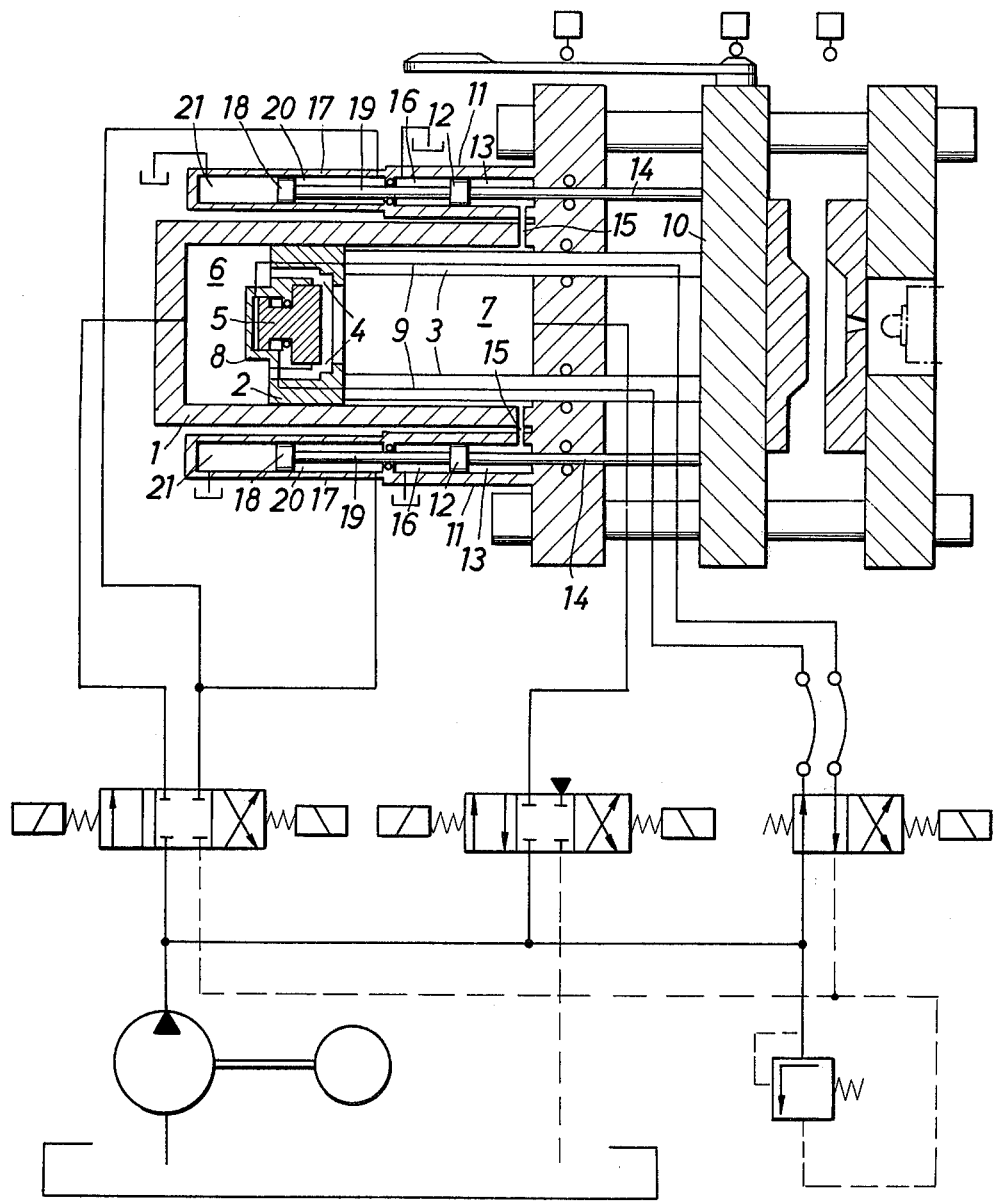

MOLD-CLOSING UNIT, PARTICULARLY FOR INJECTION-MOLDING MACHINES

The invention is concerned with a mold-closing unit for an injection-molding machine with a double acting closing piston in a closing cylinder which is subdivided by the closing piston into two working spaces filled with a pressure medium which are connected with each other by closable connecting channels in the closing piston, in which arrangement is fastened on the closing piston at least one piston rod extending into one of the working spaces which is connected with a movable mold part.

Such connecting channels capable of being shut off by a valve in the double-acting closing piston make it possible, particularly if the valve can be operated independently of the path of the closing piston or of the pressure in the closing cylinder at any point of the entire closing and opening stroke of the closing piston, to change the travel speed of the closing piston and change the closing and opening force with constant pressure of the pressure medium because, depending on the position of the valve, a large pressure surface is operative on one or the other side of the closing piston, or a differential force is effective determined by the difference of the free frontal areas of the closing piston which corresponds at most to the cross section of the piston rod. It is known (German laid-open patent application No. 2,146,515) to arrange on the side of the closing piston away from the two piston rods connected with the movable mold part an auxiliary piston rod whose cross section is smaller than the total cross section of the two piston rods connected with the movable mold part. This offers the advantage that the working speed, or the operating force respectively for the mold part to be moved in the slow stroke of the closing piston, therefore with the connecting channels open, is for a given pressure of the pressure medium independent of the minimum cross sectional area of the piston rod moving the mold part required for reason of strength. A further advantage consists in that: by the additional auxiliary piston rod which with the entering of the piston rods connected with the mold part into the closing cylinder withdraws to a corresponding extent from the closing cylinder and vice versa, the change of the total free volume of both working spaces of the closing cylinder is only as large as the ratio of the total cross section of the piston rod to the cross section of the auxiliary piston rod. Correspondingly the required quantity of the pressure medium supplied by the pressure-medium pump to the closing cylinder is small.

It is the object of the invention to improve the described known mold-closing unit in such a way that a reduction of the overall length of the mold-closing unit becomes possible without increasing thereby the amount of pressure-medium required for the slow stroke of the closing piston.

This problem is solved according to the invention by having the interior of the closing cylinder in hydraulic communication with the working space of at least one auxiliary cylinder whose auxiliary piston is mechanically coupled with the closing piston thus increasing the working volume of the auxiliary cylinder with the entrance of the piston rod into the closing cylinder and correspondingly decreasing the working volume of the auxiliary cylinder with the withdrawal of the piston rod from the closing cylinder. By the invention it becomes possible to reduce the overall length of the mold-closing unit considerably, because the place for the auxiliary cylinder can be chosen independently to a large extent. In particular, the auxiliary cylinder can be, as generally preferred, arranged laterally to the closing cylinder. The auxiliary piston moves together with the closing piston. When the piston rod is moved out of the closing cylinder, the pressure medium is pumped from the auxiliary cylinder into the closing cylinder, and when the piston rod is moved into the closing cylinder, the pressure medium is correspondingly displaced into the auxiliary cylinder. The quantity of pressure-medium to be additionally supplied by a pressure-medium pump or to be discharged respectively in the slow stroke of the closing piston is determined by the ratio of the volume change in the working space of the auxiliary cylinder to the total volume change in the closing cylinder.

The auxiliary piston has to be coupled for automatic operation with the closing piston according to the desired volume balance. In such an arrangement, a step-up or step-down of the speed of movement of the auxiliary piston in relation to that of the closing piston is possible by means of an appropriate gearing. Also the directions of movement of the closing piston and the auxiliary piston can be different. In the case of a lateral arrangement of the auxiliary cylinder, preferably the directions of movement of the closing piston and the auxiliary piston are the same, in which case the working space of the auxiliary cylinder is arranged on the side of the auxiliary piston facing the mold part.

The auxiliary piston can particularly be firmly connected with the movable mold part. The auxiliary piston contributes in this case in one of its directions of movement to moving the mold part. This offers the advantage that by an appropriate selection of the free cross section of the working space in the auxiliary cylinder in proportion to the total cross section of the piston rod of the closing piston and by an appropriate selection of the pressure differential on the two front surfaces of the auxiliary piston, as well as possibly by constructing the auxiliary piston as a differential piston, the operational speed of the mold part and the operating force respectively in the slow stroke can be freely chosen, It can, for instance, be advantageous if the resulting operating force for the auxiliary piston is inversely greater than the force acting around the profile of the piston rod at the same pressure. The slow stroke of the mold part occurs then in that direction in the motion of the closing piston in which its piston rod moves into the closing cylinder.

The free cross section of the working space of the auxiliary cylinder can be equal to, smaller or larger than the cross section of the piston rod of the closing cylinder depending on the direction in which the slow stroke is supposed to take place with the connecting channels in the closing piston open and depending on the operating force acting in this case upon the mold part. Another possibility of a variation results from the selection of the pressure applied on the side of the auxiliary piston away from the working space of the auxiliary cylinder.

In case the auxiliary piston is firmly connected with the mold part, the latter can also directly be used as a return piston for the closing piston. The auxiliary piston is in such a setup constructed as a double-acting piston and the direction of movement of the auxiliary piston and with it of the movable mold part is controlled by an adjustment of the counter-pressure away from the side of the working space of the auxiliary cylinder connected with the closing cylinder. If for instance the cross section of the pressure medium, i.e. the cross-sectional area subject to the pressure action of the working space of the auxiliary cylinder connected with the closing cylinder facing the mold part, is larger than the cross section of the piston rod of the closing piston but smaller than the sum total of the cross section of the piston rod of the closing cylinder and of the pressure-medium cross section of the working space of the auxiliary cylinder away from the movable mold part, therefore not connected with the closing cylinder, the slow closing stroke can then take place by pressure application upon both working spaces of the closing cylinder as well as upon both working spaces of the auxiliary cylinder, whereas the return of the movable mold part and of the closing piston takes place by venting of the working space of the auxiliary piston not connected with the closing cylinder with the two working spaces of the closing cylinder as well as with the working spaces of the auxiliary cylinder connected with it remaining under pressure.

The auxiliary cylinder and the return cylinder can also be coaxially arranged in series in which arrangement the return piston is firmly connected with the auxiliary piston. In a design in which the auxiliary piston and the return piston are set up adjacent to the closing cylinder, a compact construction with a short overall length of the mold closing unit is achieved.

In mold-closing units of the kind in question, two piston rods can also be provided on the closing piston, as it is known in itself for the purpose of an accurate guidance of the movable mold part. In this case, there are in conformity also advantageously two auxiliary cylinders provided according to the invention.

In the single FIGURE of the drawing is illustrated a mold-closing unit according to the invention in a schematic representation and as an example together with the circuit diagram belonging to it and intelligible from the drawing.

The drawing shows a mold-closing unit for an injection-molding machine housing a closing cylinder 1 an axially movable closing piston 2 which is capable of being acted upon by the application of pressure on both sides. The closing piston 2 is firmly connected with the movable mold part 10 of the die mold which is capable of being acted upon by the application of pressure on both sides. The closing piston 2 is firmly connected with the movable mold part 10 of the die mold by means of two piston rods 3. The two working spaces 6 and 7 of the closing cylinder 1 are in communication with each other by way of connecting channels 4 in the closing piston 2. These connecting channels 4 can be shut off by a shut-off piston 5 which is axially movable in the closing piston 2. The shut-off piston operated to this end in a control cylinder 8 formed in the closing piston as a differential piston, in which setup two control lines 9 for the two working spaces of the control cylinder 8 are led out of the closing cylinder 1 through the piston rods 3.

The front surface of the closing piston 2 on the side of the piston rods is smaller by the cross section of the piston rods 3 than the front surface of the closing piston away from them. If therefore the working spaces 6 and 7 are put under pressure with the connecting channels 4 open, a resulting force ensues, in the drawing toward the right, for the closing stroke of the movable mold part 10. In the closing motion, the piston rods 3 move more and more out of the closing cylinder 1, so that the free total volume in the closing cylinder 1 is increased. In order not to have to replenish permanently the pressure medium corresponding to the volume change, two auxiliary cylinders 11 are provided with auxiliary pistons 12 working in them, each of which is by means of a piston rod 14 firmly connected with the movable mold part 10. Between the working space 7 of the closing cylinder 1 on the side of the piston rods and the working spaces 13 of the auxiliary cylinder 11 facing the moving mold part 10 exists a permanently open flow connection 15. When therefore, the free total volume in the closing cylinder 1 increases with the withdrawal of the piston rod 3, pressure medium is transferred from the decreasing volume of the working spaces 13 of the auxiliary cylinder 11 into the closing cylinder and thus the increase of the free total volume in the closing cylinder is balanced to a large extent. On the contrary, with the slow opening of the die mold and the progressing entrance of the piston rod 3 into the closing cylinder 1, pressure medium is displaced by way of the flow connection 15 into the simultaneously expanding working spaces 13 of the auxiliary cylinders 11.

The free cross-sectional flow area of the working spaces 13 of the auxiliary cylinders 11 is slightly smaller than the cross section of the piston rods 3, so that with the application of pressure on the working spaces 6 and 7 of the closing cylinder and thus also of the working spaces 13 of the auxiliary cylinders 11, a resulting force ensues in the closing direction for the movable mold part 10. The working space 16 of the auxiliary cylinder 11 away from the piston rods 14 of the auxiliary pistons 12 is, as shown in the drawing, permanently vented.

For the return motion of the movable mold part 10 and of the closing piston 2, two return cylinders 17 are provided with appropriately unilaterally operating return pistons 18. The return cylinder 17 and the return pistons 18 lie in each case coaxially behind the auxiliary cylinders 11. The return pistons 18 and the auxiliary pistons 12 are always firmly connected with each other with the help of a connecting rod 19. The return pistons 18 are therefore in each case firmly fastened to the movable mold part 10 by means of the connecting rods 19, the auxiliary pistons 12 and their piston rods 14. The working spaces 20 of the return cylinders 17 facing the movable mold part 10 are adjustably acted upon by the pressure-medium. The working spaces 21 on the other side of the return pistons 18 are, as shown in the drawing, vented.

In its preferred operational sequence, the device begins in the mold-open position, that is, the movable mold part 10 is fully to the left as shown in the figure. Piston 5 is in the closed position i.e. to the right in working cylinder 8 blocking connecting channels 4. Working space 6 contains fluid under pressure which is opposed by the pressure of the fluid in closed working space 7.

In order to close the mold 10, piston 5 is moved to the left through supply of pressurized fluid to the right side working chamber of control cylinder 8 through one of the control lines 9, thereby opening connecting channels 4. The difference in the working areas on the left and right sides of mold closing piston 2 causes the mold to move to the right through the action of rods 3 thereby closing the mold. Auxiliary pistons 12 simultaneously move to the right and cause fluid within auxiliary chambers 13 to pass into working space 7 through flow connection 15. This fluid acts to fill a substantial portion of the space increase caused by the withdrawal of rods 3 from the chambers 6 and 7.

When the opening of the mold is desired, return cylinders 17 are pressurized which causes the return pistons 18 to move to the left against the pressure differential in working spaces 6 and 7 acting in the opposite direction. When fully open, piston valve 5 may be moved to the closed position blocking channels 4. Pressure to return cylinders 17 may then be cut off and the mold unit will be at rest.

It becomes easily evident from the drawing that the displayed mold-closing unit has a very short overall length due to the laterally adjacent arrangement of the auxiliary cylinders and return cylinders to the closing cylinder.

The return cylinders 17 can possibly be also completely eliminated. The working spaces 16 of the auxiliary cylinder 11 are in this case equipped with a pressure-medium line (not shown), so that the auxiliary piston 12 can operate in a double-acting manner. In the example shown in the drawing, the front surface of the auxiliary piston 12 acted upon by the pressure-medium flowing into the working space 13 of the auxiliary cylinder 11 connected with the closing cylinder 1 has to be in this case larger than the cross section of the piston rod 3 of the closing piston. This front surface is however smaller than the sum total of the frontal area of the auxiliary piston 12 facing the working space 16 and the cross section of a piston rod 3.

For the closing stroke of the movable mold part 10, the working spaces 6 and 7 in the closing cylinder are put under pressure by way of the connecting channels 4 in the closing piston 2. By way of the flow connection 15 also the working spaces 13 of the auxiliary cylinders as well as in each case also the working space 16 of the auxiliary cylinders 11 are put under pressure.

For the return motion of the movable mold part 10 and the closing piston 2 the pressure is maintained in the working spaces 6 and 7 of the closing cylinder 1 and the working spaces 13 of the auxiliary cylinders, while their working space 16 is vented, so that on account of the front surfaces of the auxiliary pistons 12 under pressure being altogether greater than the total cross section of the piston rod 3, a net action results for the opening stroke of the movable mold part 10 toward the left in the drawing.

Having thus described my invention, I claim:

1. A mold-closing unit for injection molding machines having a double acting closing piston operating in a closing cylinder divided by the closing piston into two pressure medium filled working chambers interconnected via a closable connecting channel in the closing piston, at least one piston rod extending through one of the working chambers and connected to a movable mold part and attached to the closing piston, the improvement which comprises at least one auxiliary cylinder having a working chamber hydraulically connected to one of the working chambers of the closing cylinder and having an auxiliary piston slidable with a piston rod which piston rod is coupled to the closing piston to move simultaneously therewith, whereby the volume of the working chamber of the auxiliary cylinder is increased when the piston rod of the closing cylinder is inserted into the closing cylinder and is correspondingly reduced when the piston rod is retracted from the closing cylinder.

2. The improvement of claim 1 wherein said auxiliary cylinder is disposed laterally of the closing cylinder.

3. The improvement of claim 2 wherein the directions of movement of the auxiliary piston and the closing piston agree with another and the working chamber of the auxiliary cylinder is disposed on the side of the auxiliary piston adjacent to the movable mold parts.

4. The improvement of claim 1 wherein the hydraulic connection is between the working chamber of the auxiliary cylinder and the working chamber of the closing cylinder.

5. The improvement of claim 3 wherein the hydraulic connection is between the working chamber of the auxiliary cylinder and the working chamber of the closing cylinder.

6. The improvement of claim 1 wherein said auxiliary piston is rigidly connected to the movable mold part.

7. The improvement of claim 4 wherein the auxiliary piston is rigidly connected to the movable mold part.

8. The improvement of claim 3 wherein the cross-sectional area of the working chamber of the auxiliary cylinder is smaller than the cross-sectional area of the closing piston rod and the side of the auxiliary piston remote from the working chamber of the auxiliary cylinder is vented.

9. The improvement of claim 1 including at least one return cylinder with a return piston for the closing piston slidable therein, said auxiliary cylinder and the return cylinder being disposed coaxial the one behind the other and the return piston is rigidly connected to the auxiliary piston.

10. The improvement of claim 6 wherein there is at least one return cylinder with a return piston for the closing piston, said auxiliary piston being double acting and functioning as a return piston.

11. The improvement of claim 10 wherein the cross-sectional area of the working chamber of the auxiliary cylinder which is adjacent to the movable mold part is larger than the cross-sectional area of the piston rod of the closing piston but smaller than the sum of the cross-sectional areas of the piston rod of the closing piston and the cross-sectional area of the working chamber of the auxiliary cylinder which can be acted upon by pressure and is remote from the movable mold part.

* * * * *